Aug. 16, 1927.  
S. H. YANCEY ET AL  
1,639,478  
GRAIN SHOCKER  
Filed May 7, 1924  
16 Sheets-Sheet 13
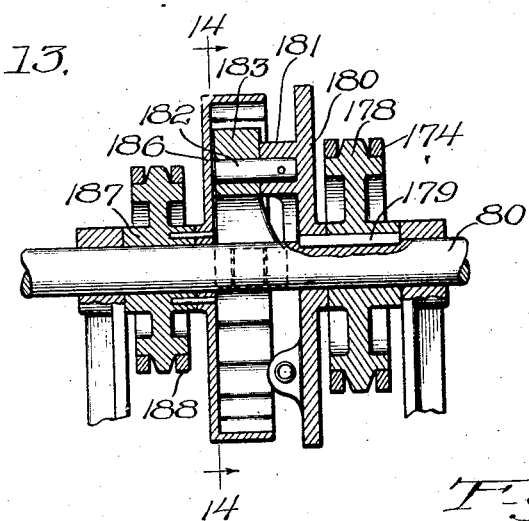
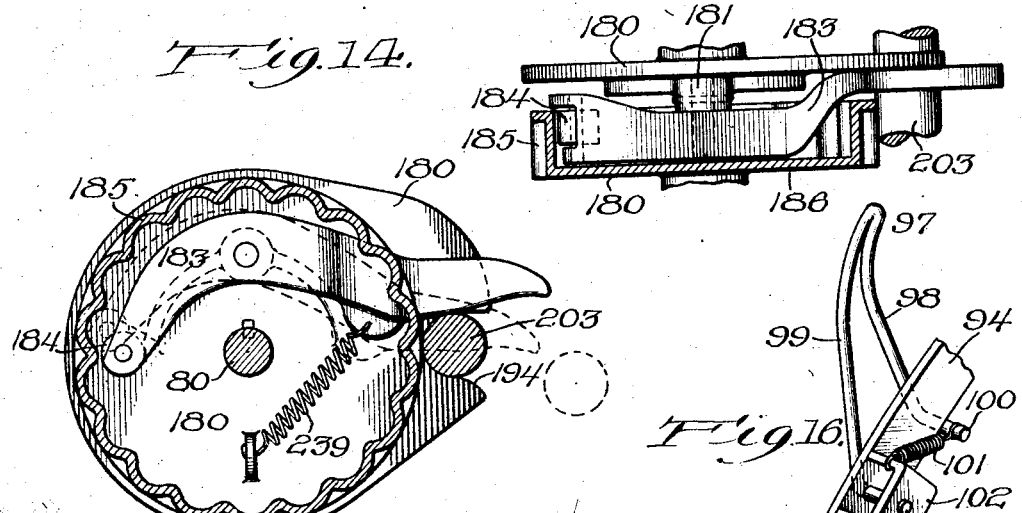
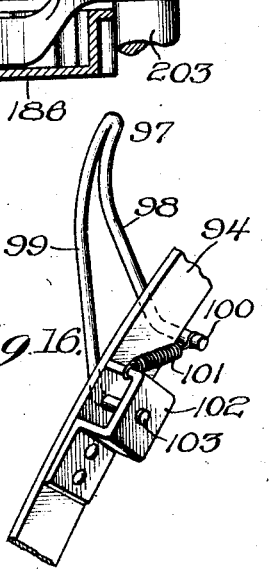
Inventors  
Samuel H. Yancey  
Harry S. Dickinson  
by Banning & Banning  
Attys

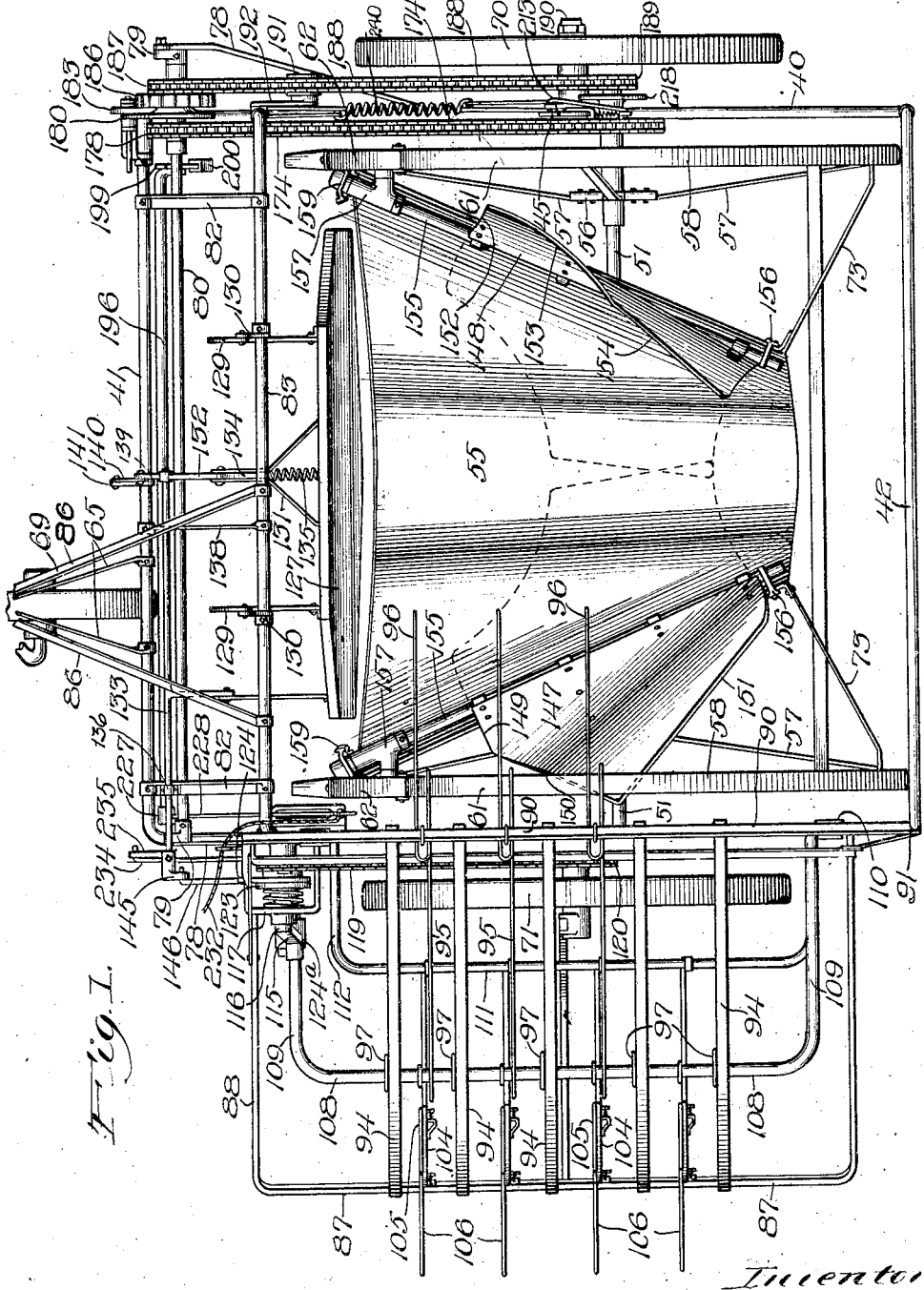

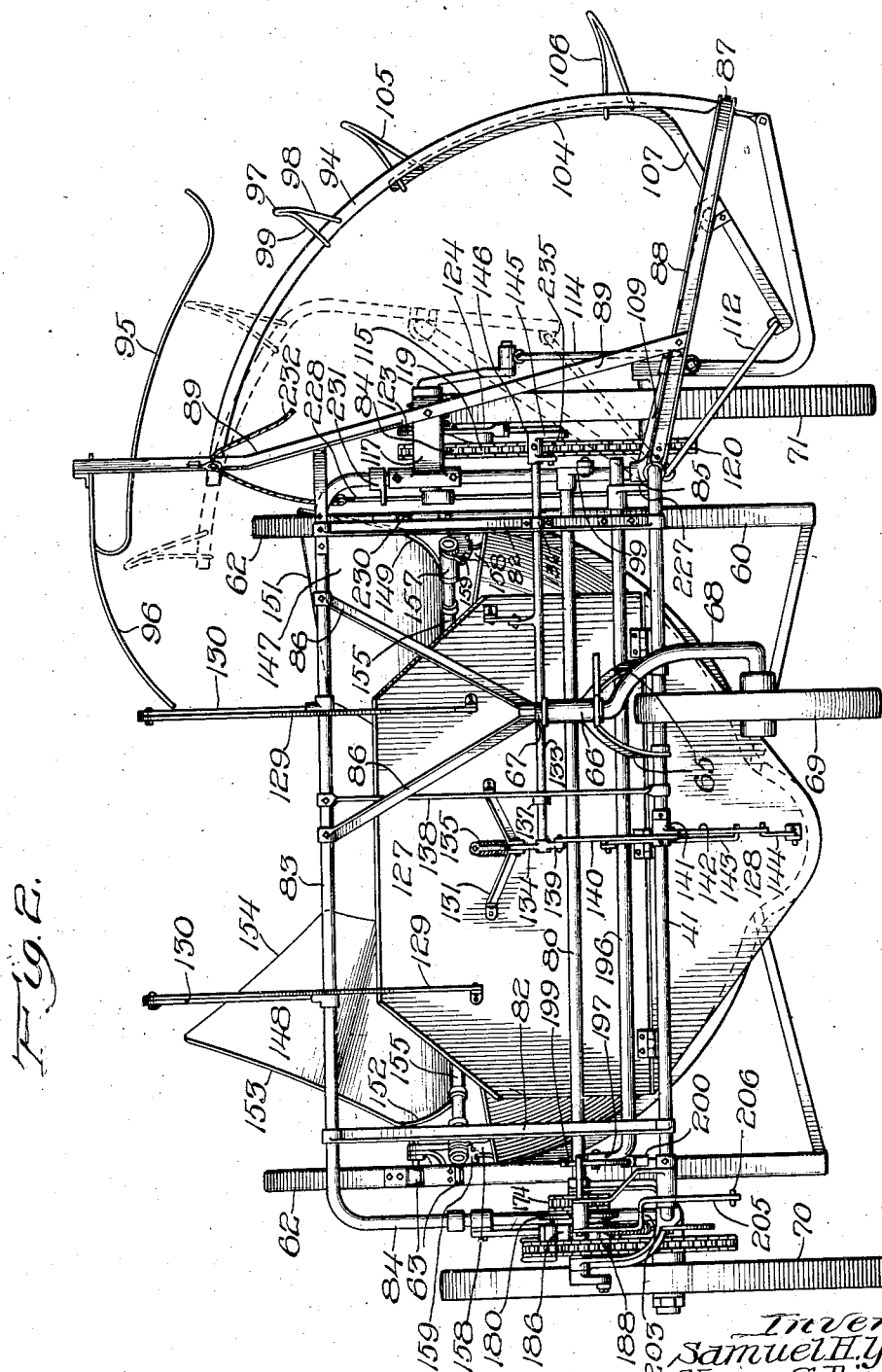

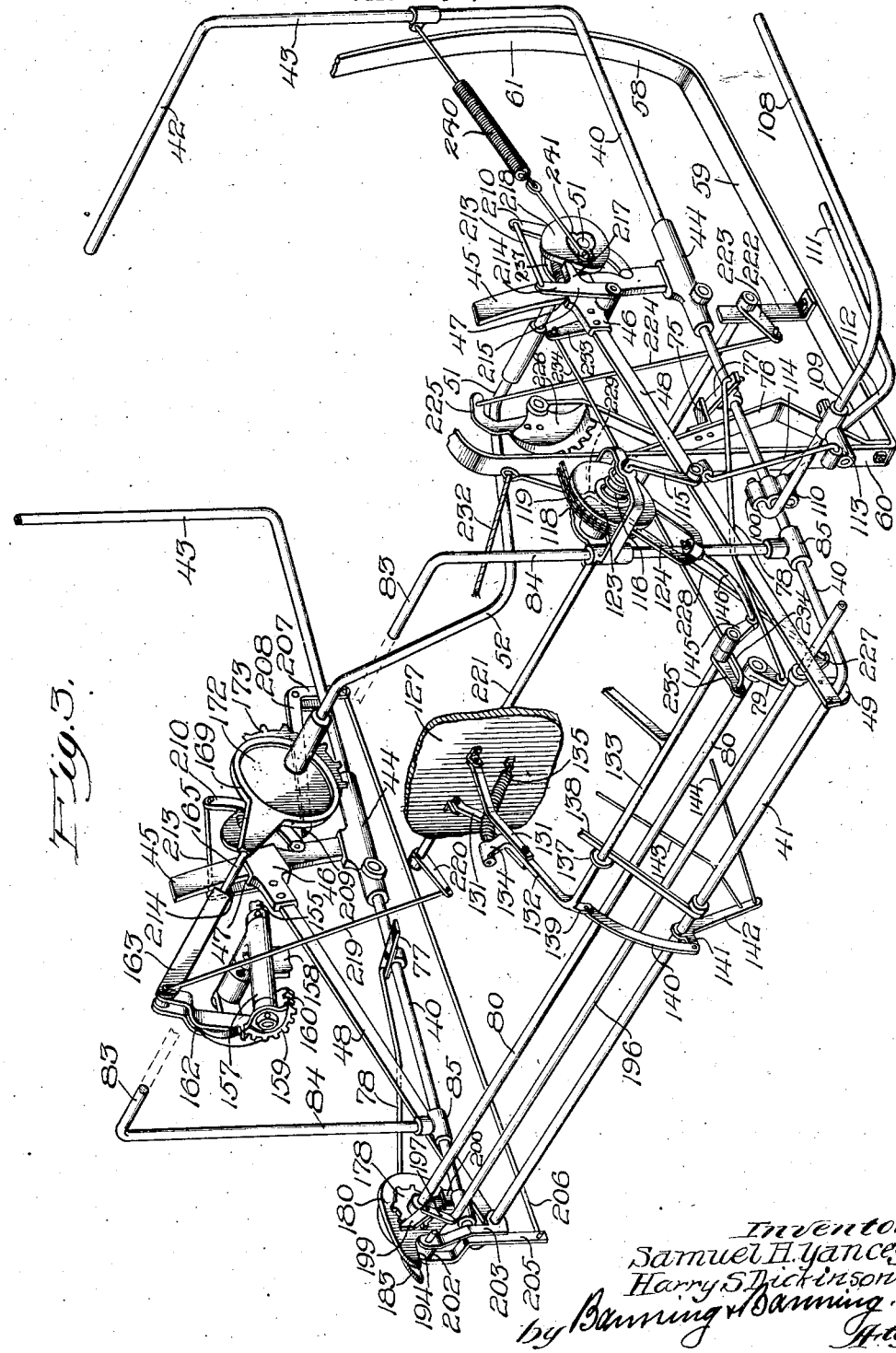

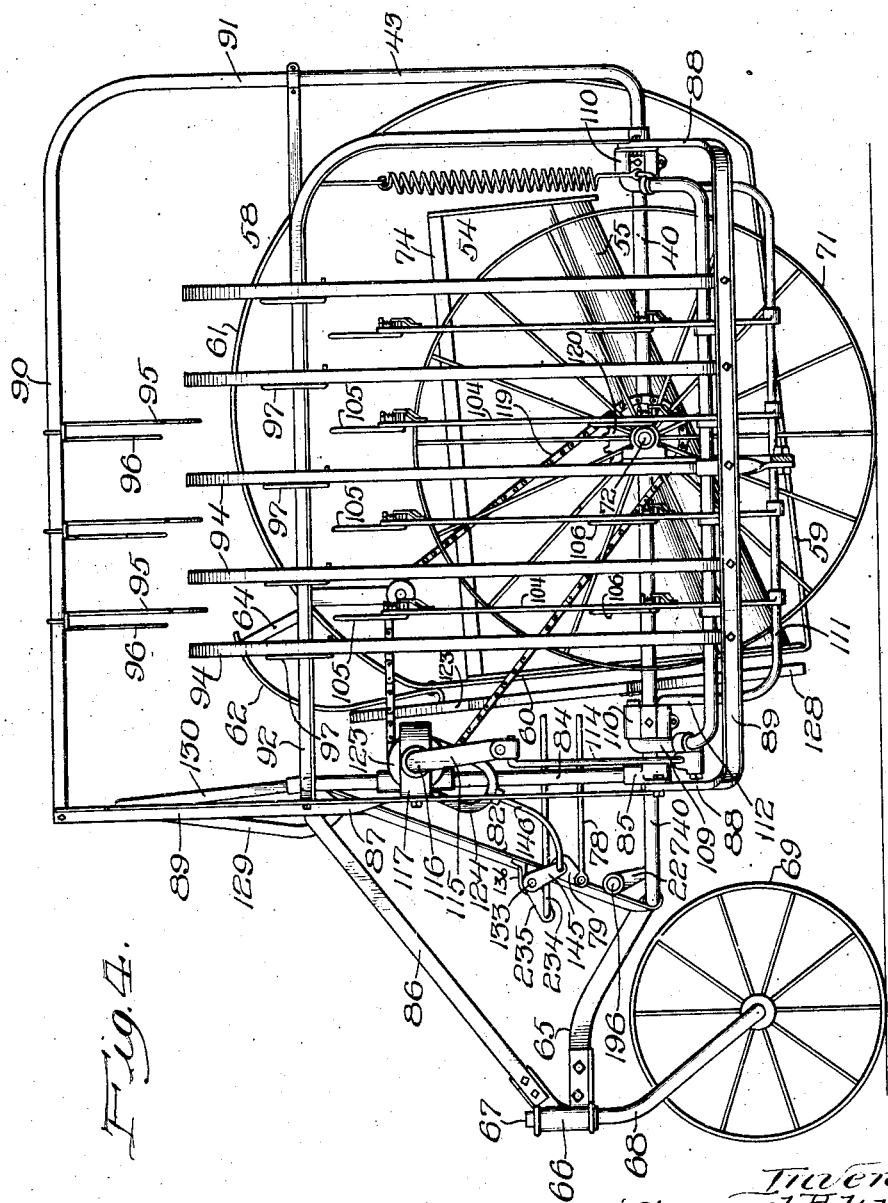

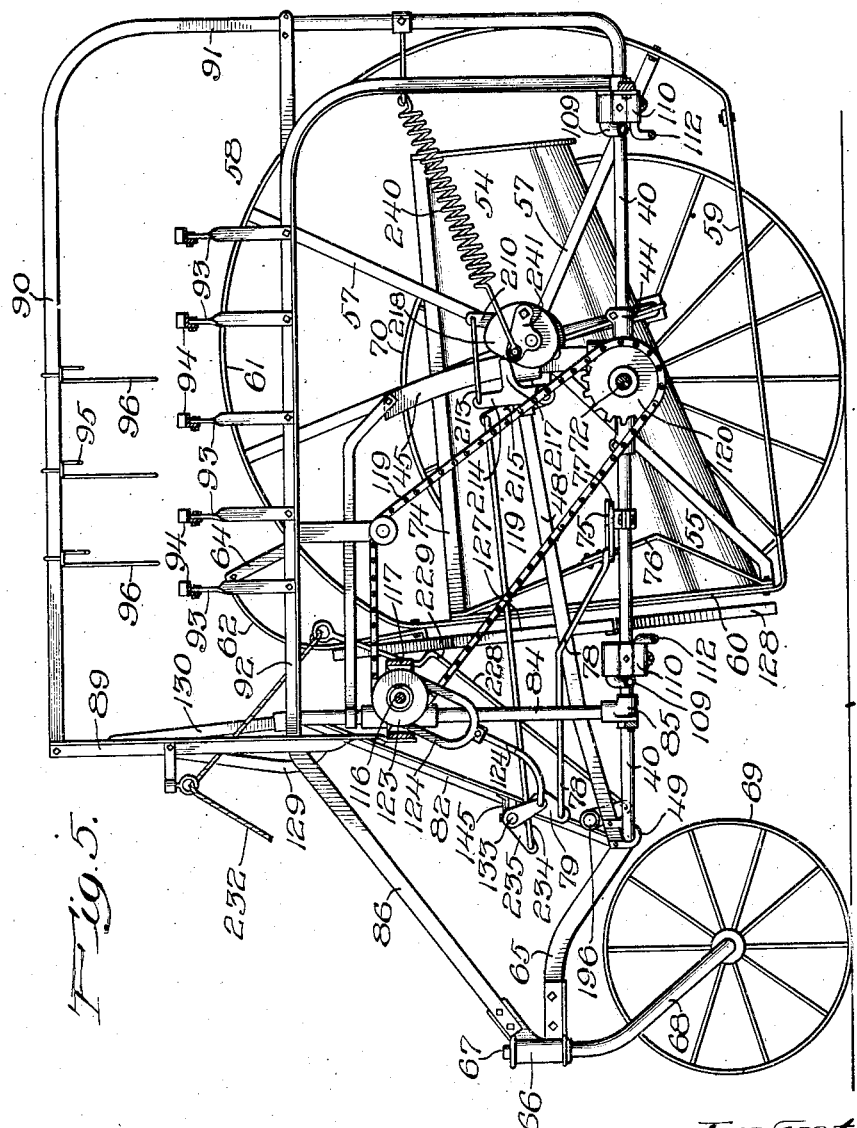

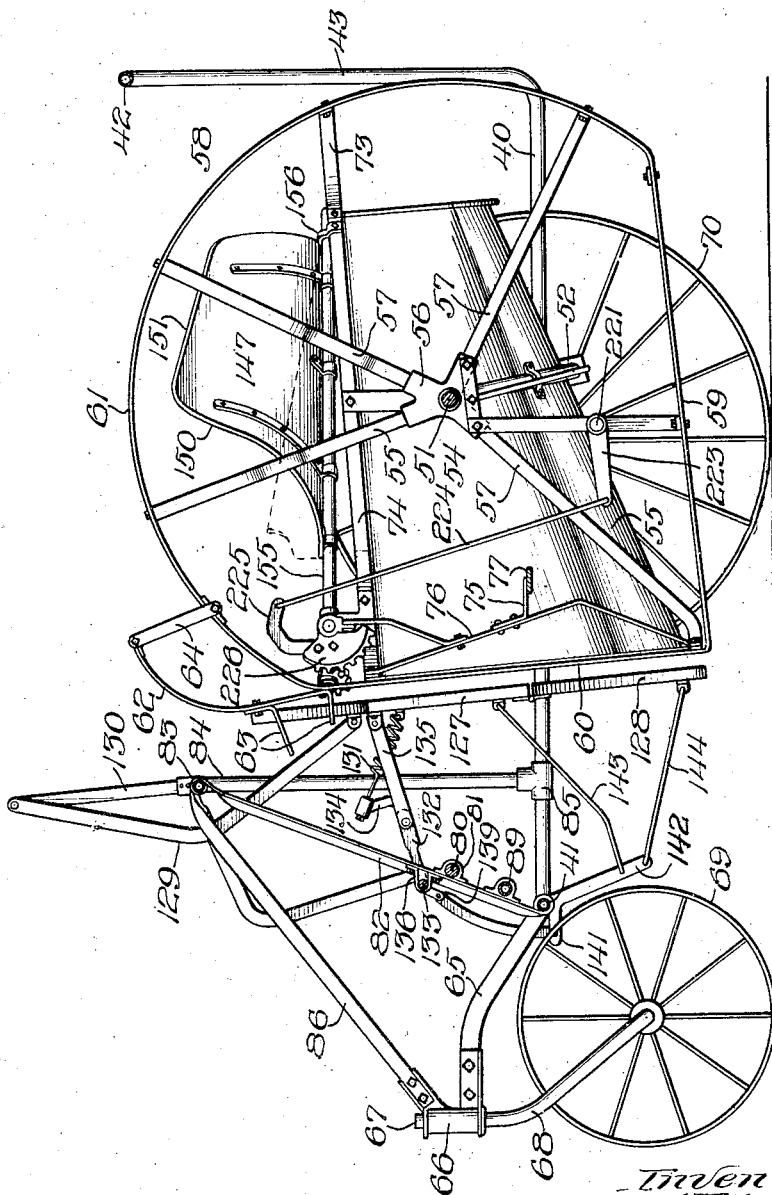

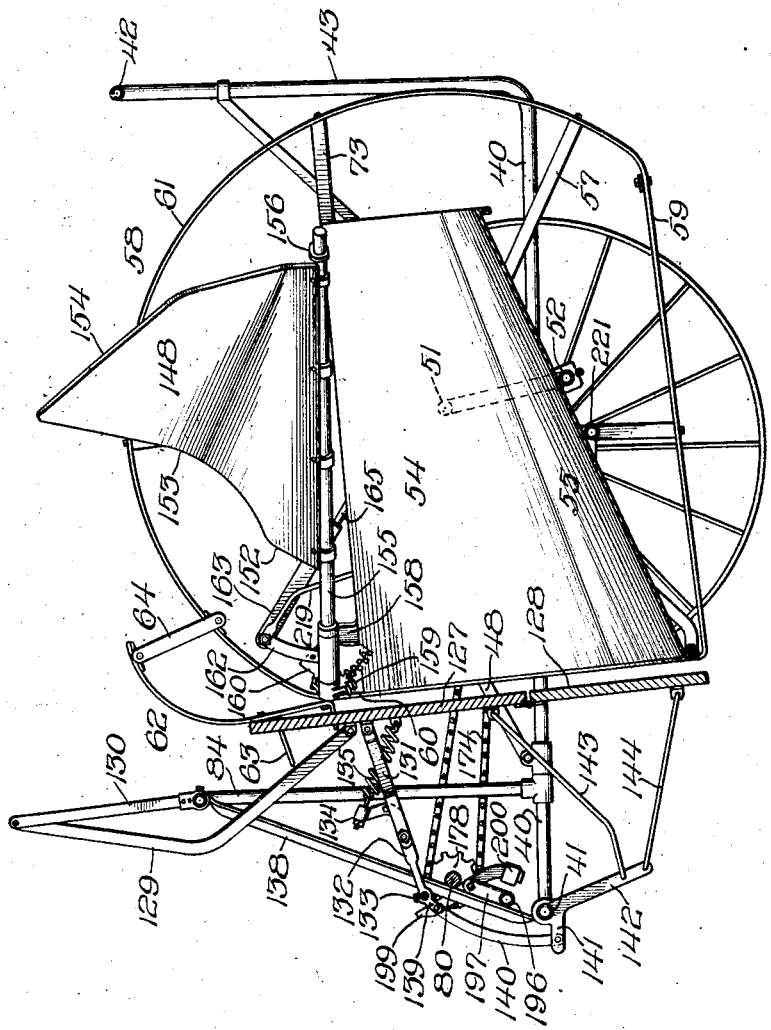

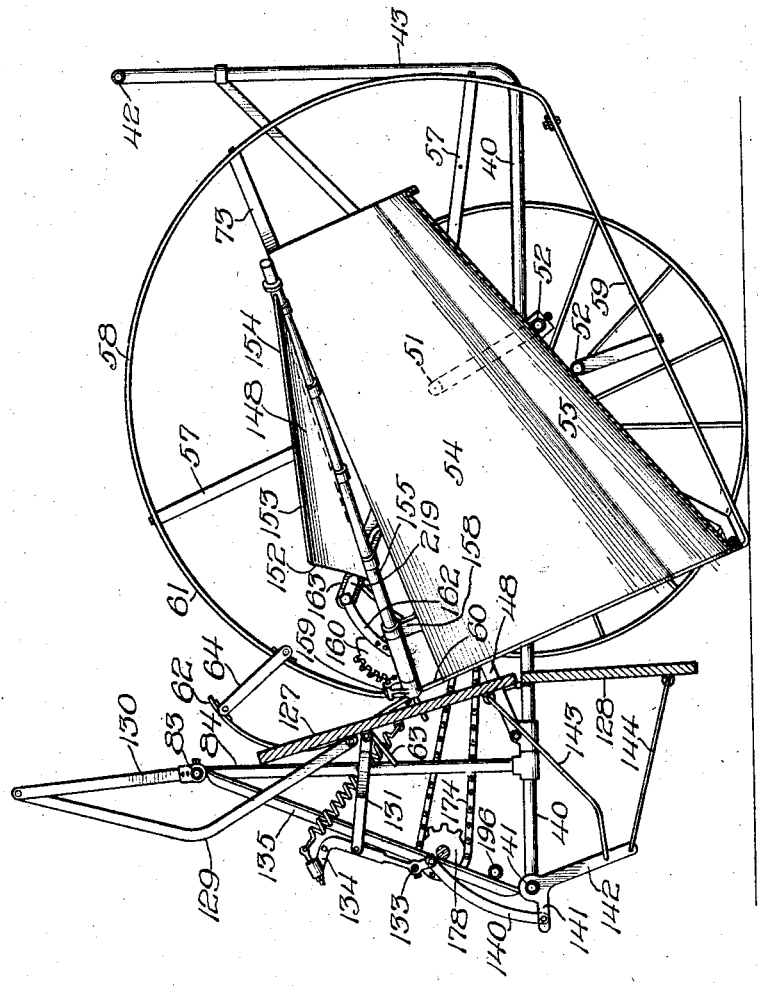

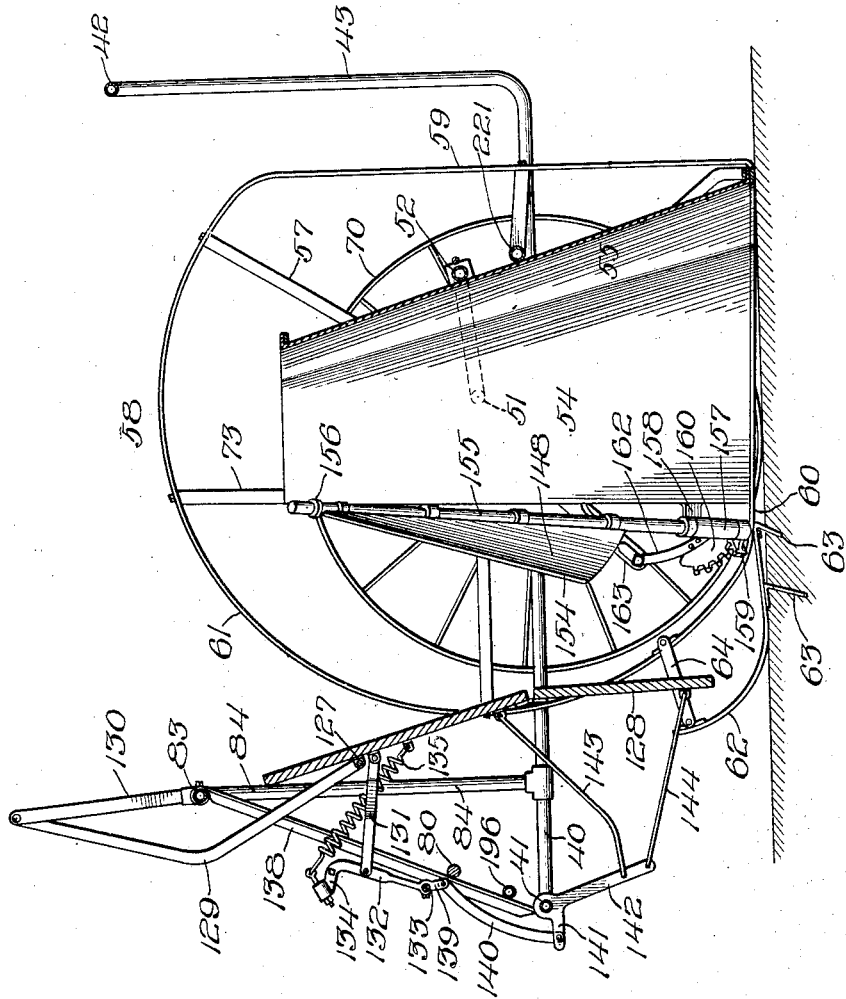

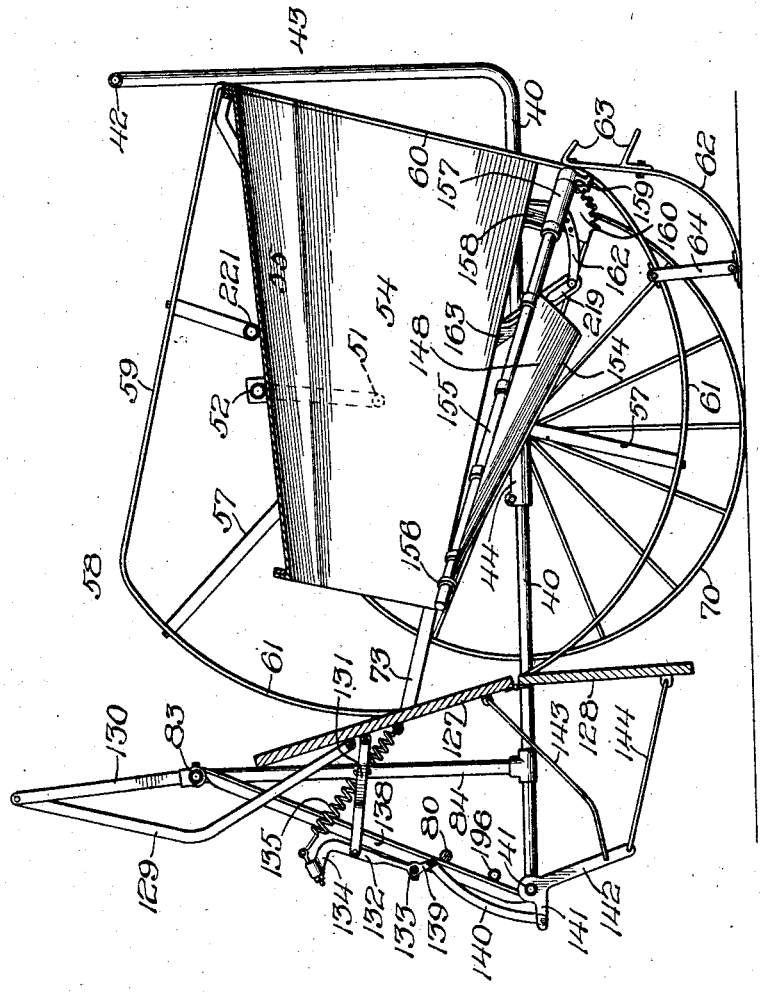

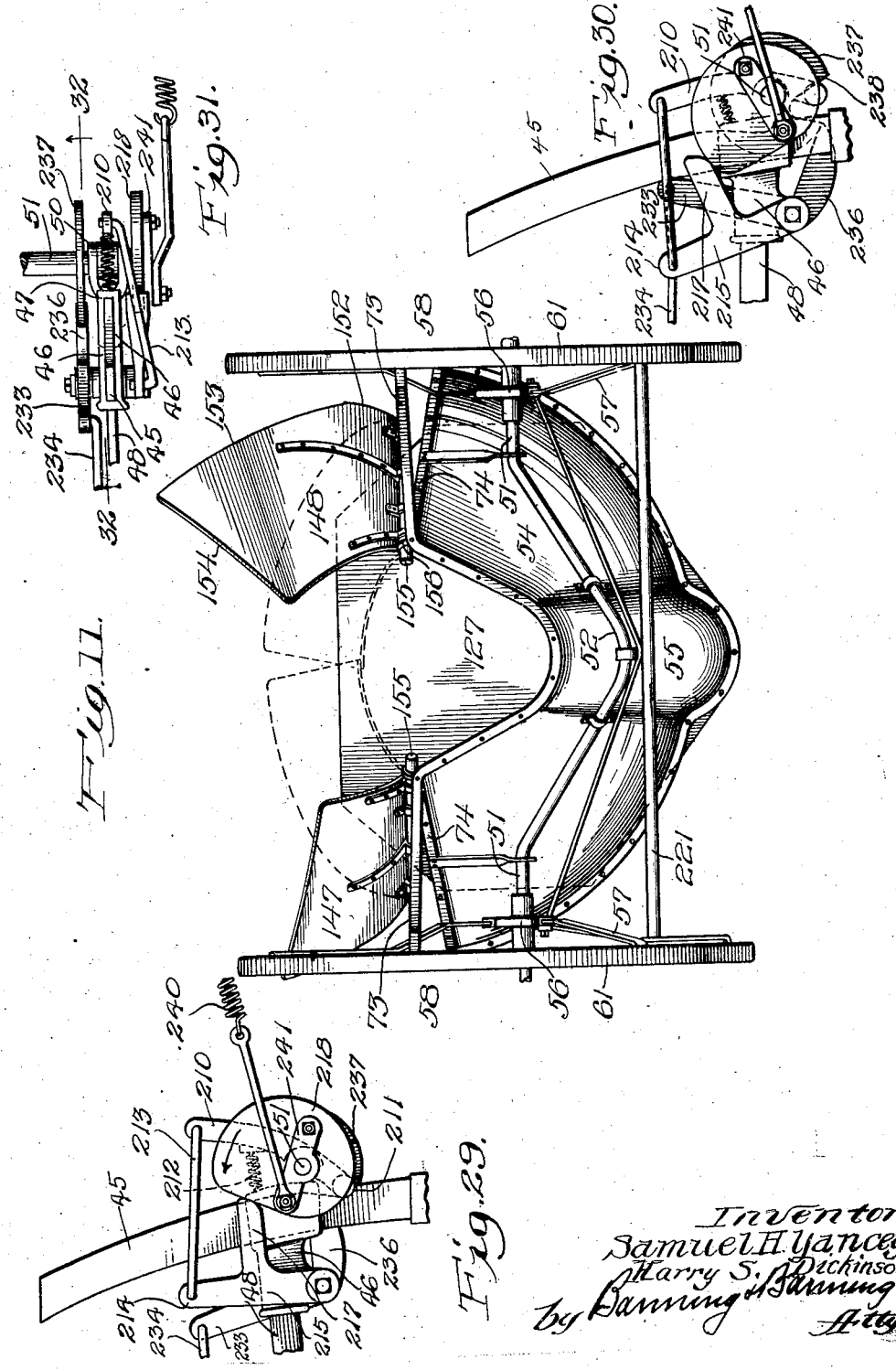

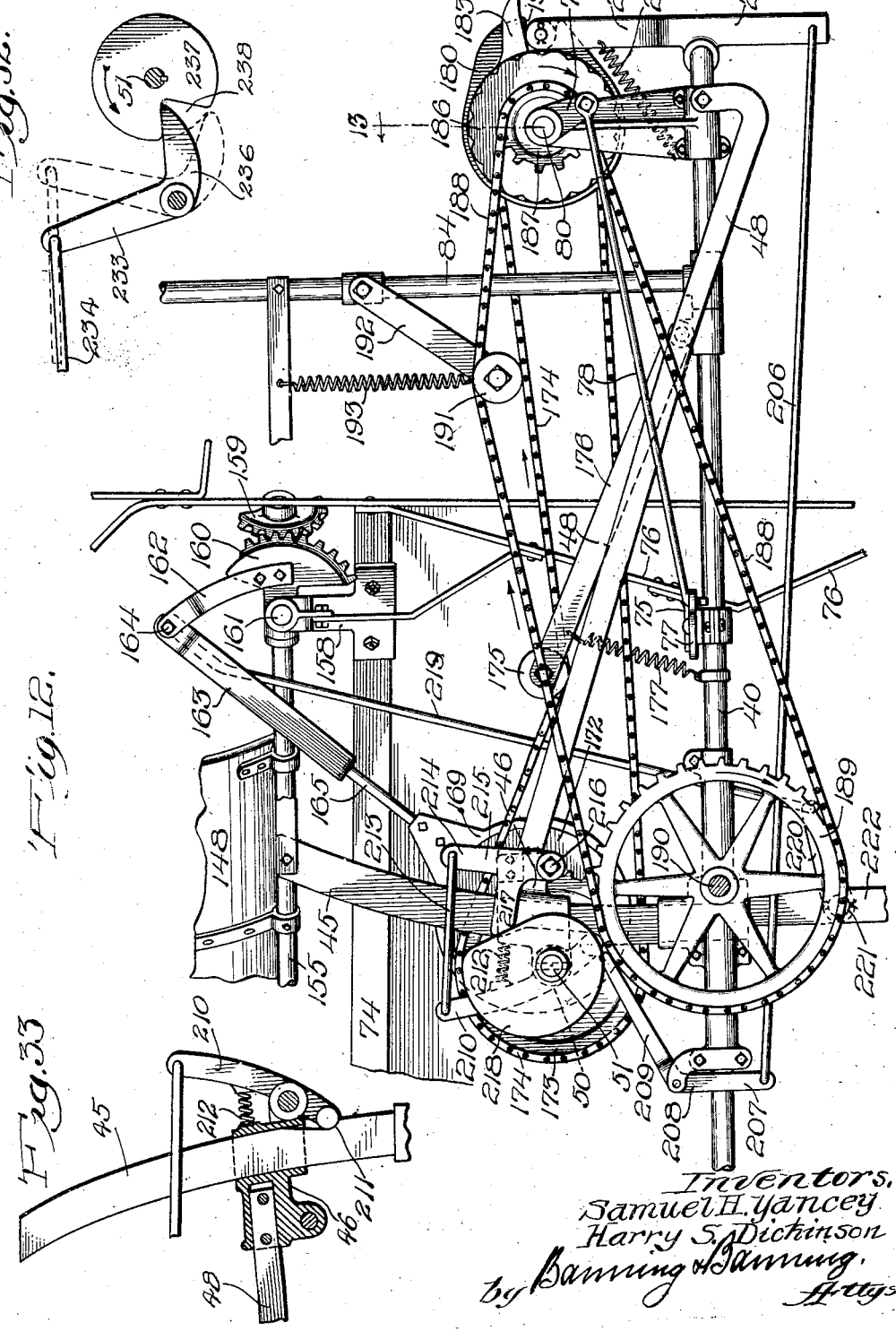

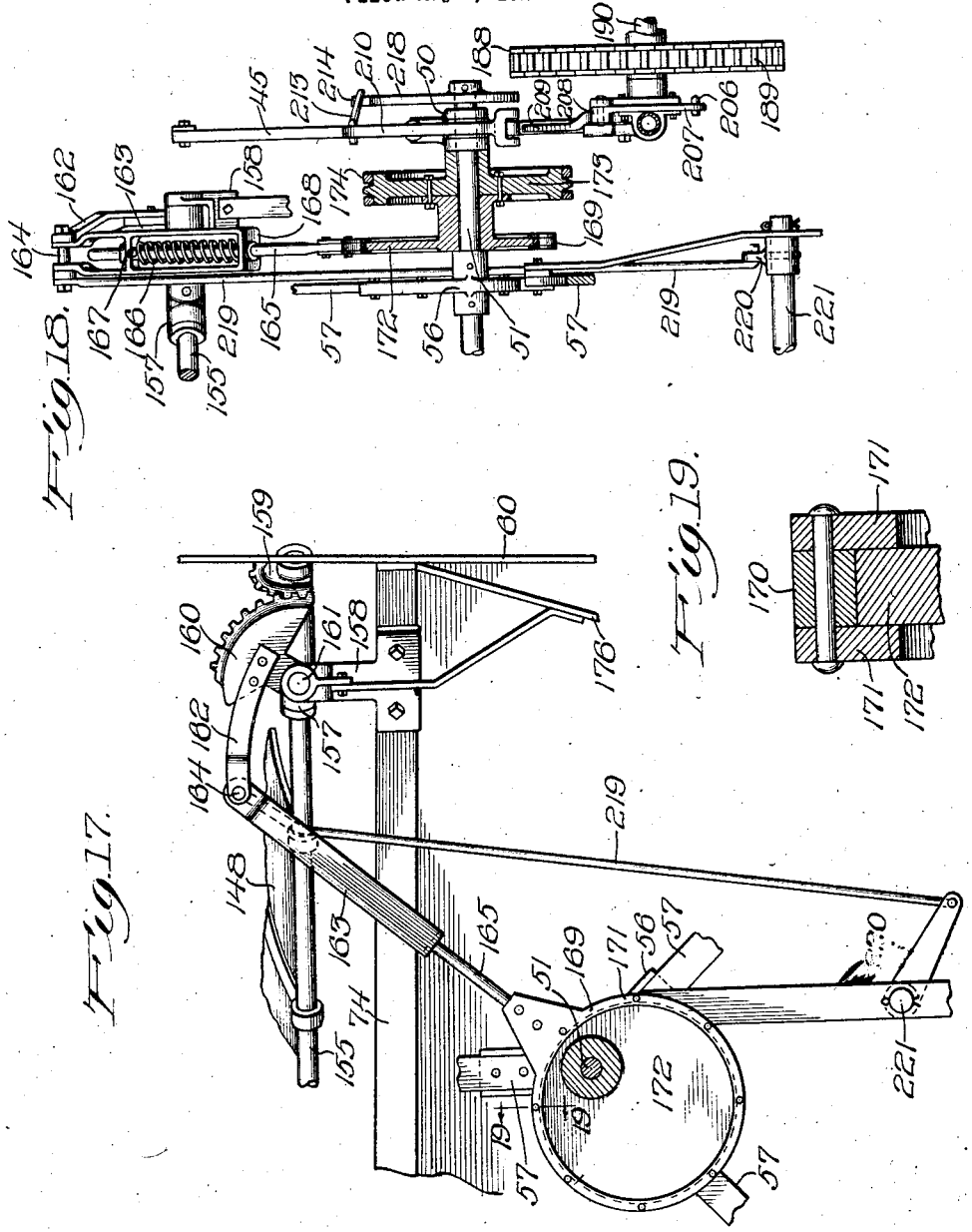

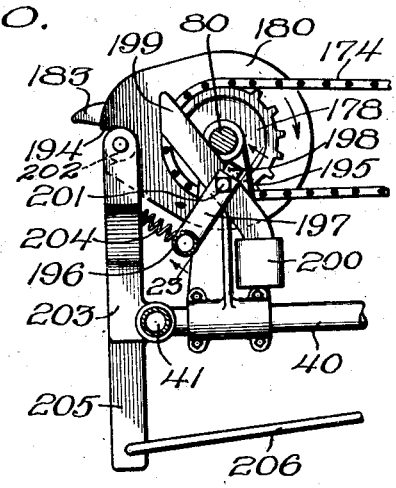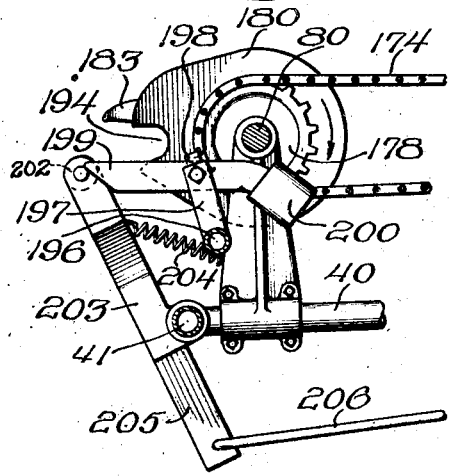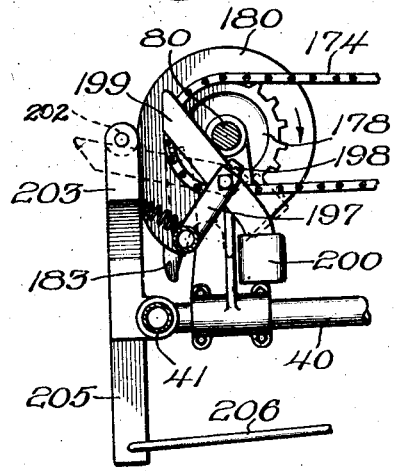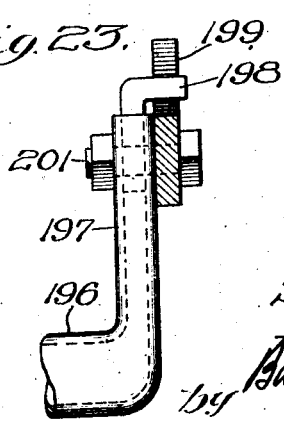

Aug. 16, 1927.
S. H. YANCEY ET AL
1,639,478
GRAIN SHOCKER
Filed May 7, 1924
16 Sheets-Sheet 16
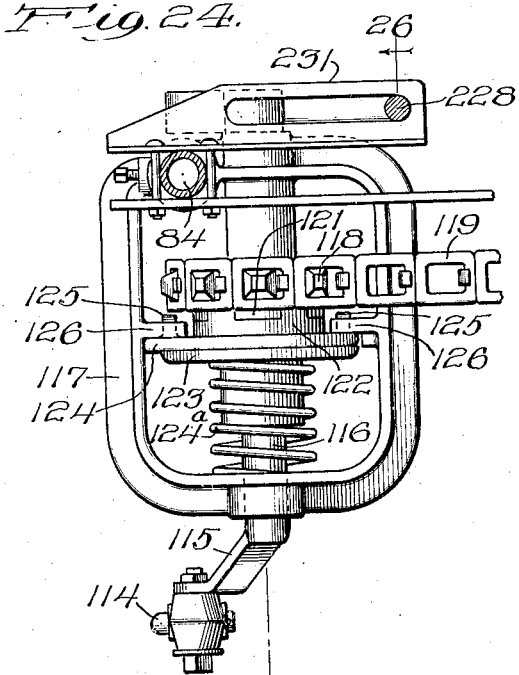
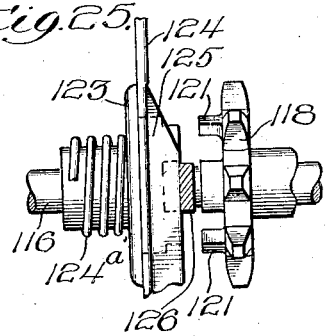
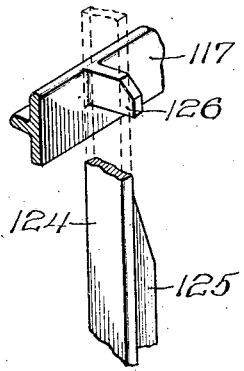
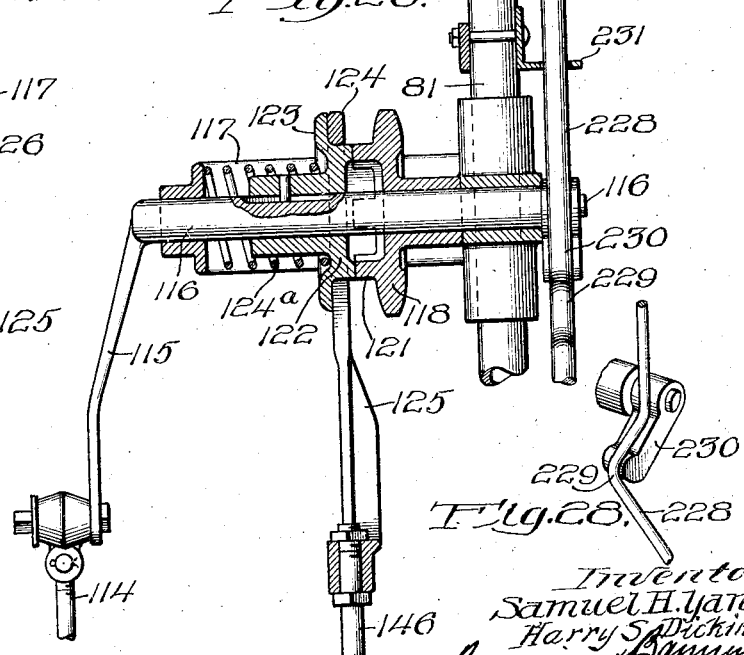
Inventors
Samuel H. Yancey
Harry S. Dickinson
by Banning & Banning
Attys.

Patented Aug. 16, 1927.

1,639,478

UNITED STATES PATENT OFFICE.

SAMUEL H. YANCEY, OF ROCK ISLAND, AND HARRY S. DICKINSON, OF MOLINE, ILLINOIS, ASSIGNORS TO BERRY SHOCKER INCORPORATED, OF CHICAGO, ILLINOIS, A CORPORATION OF DELAWARE.

GRAIN SHOCKER.

Application filed May 7, 1924. Serial No. 711,614.

This invention relates to that type of grain shocker which employs an open pan which normally lies in prostrate position to receive the bundles of grain as delivered from the binder with their butt ends forward, and which grounds the shock by an uptilting of the pan, after which the pan performs a complete revolution and vaults over the grounded shock in its return to receiving position.

In the effort to develop a successful shocker of this type, difficulty has heretofore been experienced in so coordinating the movements of the various mechanisms as to avoid a toppling over of the shock as the pan passes over the same. This difficulty has been due to a combination of causes, chief of which may be mentioned the fact that the momentum of the up ended shock, as its base is suddenly deposited upon the ground, tends to topple the shock forwardly. Added to this, difficulty has been experienced in so actuating the pan that all portions thereof will be sufficiently elevated to clear the standing shock as the machine advances away from it.

In order to avoid these difficulties, it is necessary to provide means for properly building up the shock in the desired form to stand firmly upon the ground when deposited; to provide means for compressing the shock prior to and during the period of its deposition on the ground; to provide means for spreading the butt of the shock to afford an ample foundation for the shock to stand upon; to guard the shock against its natural tendency to topple over due to its acquired momentum and so co-ordinate all of the various mechanisms required in building up and discharging the shock that they will act in harmony with one another in the performance of the various functions referred to.

The present invention is directed to improvements in the delivery mechanism for insuring a uniform accumulation of the grain bundles within the pan; to the means for compressing the bundles within the pan in such a way as to cause a spreading of the base of the shock by the proper application of pressure to the waist of the shock; and to the means provided for actuating the pan and imparting to it a proper movement to deposit the shock and completely clear the same without interference, which movement must be combined with the forward advance of the machine as a whole.

The invention further relates to the mechanisms provided for insuring a correlated sequence in the various operations after the same have once been set in operation, and to the construction and arrangement of the shocker as a whole and the individual parts thereof.

In the drawings:

Figure 1 is a plan view of the shocker with the pan in its prostrate receiving position;

Fig. 2 is a front elevation of the same;

Fig. 3 is a skeletonized view with the pan and other portions of the shocker removed in order to better display the construction and arrangement of the frame work and the relation of the operating parts to one another;

Fig. 4 is a side elevation from the binder side of the shocker with certain of the more distant mechanisms removed for the sake of clearness;

Fig. 5 is a view from the binder side of the shocker with the elevator and proximate ground wheel removed and the compressor wings omitted from the pan for the sake of clearness;

Fig. 6 is a view from the same side of the machine showing in special detail the pan and tread wheels with the butting board mechanism;

Fig. 7 is a longitudinal sectional elevation through the center of the pan with the parts in receiving position;

Figs. 8, 9 and 10 are similar views showing the pan in positions progressively assumed during the discharge of the shock;

Fig. 11 is a rear end elevation of the pan and ground treads with the frame, ground wheels and operating mechanisms omitted;

Fig. 12 is an enlarged detail taken from the outer side of the shocker and showing the mechanisms provided for releasing the pan and operating the compressor wings;

Fig. 13 is a sectional detail of the clutch shown in Fig. 12, taken on line 13 of Fig. 12.

Figs. 14 and 15 are additional sectional details of said clutch and associated parts;

Fig. 16 is a perspective detail of one of the spring held fingers on the elevator;

Fig. 17 is a detail showing the eccentric and associated parts for operating one of the compressor wings;

Fig. 18 is a view partially in section and taken at right angles to the position assumed by these parts in Fig. 17 and with the eccentric in a different position of adjustment;

Fig. 19 is a sectional detail of the eccentric strap and eccentric of Fig. 17, taken on line 19 of said figure;

Figs. 20, 21, and 22 are three views of the tripping mechanism for the clutch of Fig. 12, in different positions of adjustment;

Fig. 23 is a view taken on line 23 of Fig. 20, looking in the direction of the arrow;

Fig. 24 is a plan view of the clutch mechanism for controlling the movements of the elevator;

Fig. 25 is a detail of the same showing the clutch elements disconnected;

Fig. 26 is a sectional elevation taken on lines 26—26 of Fig. 24;

Fig. 27 is a detail of the cam bar for throwing said clutch;

Fig. 28 is a detail of one of the connections for tripping the mechanisms into operation;

Figs. 29 and 30 are two views of the cam for operating a trip for releasing the pan;

Fig. 31 is a plan view of the same mechanism;

Fig. 32 is a detail taken on line 32—32 of Fig. 31; and

Fig. 33 is a detail partly in section showing the trip for releasing the pan.

*Frame and pan mounting.*

The shocker is built upon a main frame, best illustrated in Fig. 3, which comprises side rails 40, a front cross rail 41, an elevated rear rail 42, and rear vertical standards 43 connecting the elevated rear rail with the side rails. As shown, the main frame is integrally constructed of tubing with the rear portion elevated to afford a clearance for the revolution of the pan and for the deposited shock. Each of the side rails has mounted thereon a tubular socket 44 which provides a mounting for an upstanding guide segment 45 of arcuate formation. The two segments serve as guides for a pair of guide blocks 46 each of which is provided with a slot 47 to receive the associated segment, and these guide blocks are mounted upon the rear ends of a pair of draw bars 48 each of which is provided at its forward end with an eye 49 which encircles the front cross rail 41 near the end thereof, the arrangement being one which permits the draw bars to swing in unison upon the front rail as an axis, and to be guided and steadied at their rear ends by engagement with the arcuate segments.

As shown in Figs. 12 and 31, each guide block 46 has extending rearwardly therefrom a pair of lugs 50 which afford a journal mounting for a pan shaft 51 which is downwardly bowed or arched in its center 52 to afford a cradle for the pan 54, which pan is of the general shape of half frustrum of a cone, open at both ends and at the top when in the receiving position. The center of the wall of the pan is configured to afford a longitudinally extending channel 55 which is provided to receive and center the first bundle delivered to the pan to afford a base or foundation for the accumulation of bundles subsequently delivered.

The shaft 51 has mounted thereon, near each end, a center mounting 56 which receives the inner ends of a series of radially extending braces 57 which connect with and support a tread wheel 58 of substantially D shape comprising a flat side 59 parallel with the rim of the pan, a flat side 60 parallel with the normal forward end of the pan, and a curved side 61 extending through the half arc of a circle having a center coincident with the axis. This gives to the entire tread member a right angle configuration throughout half of its circumference, and a circular configuration for the remaining half, and it will also be noted that the point of greatest distance from the axle center is a point in alignment with the bottom of the pan at its enlarged open end.

Each tread member, at the point of mergence of the straight section 60 with the curved section 61, is provided with a bowed extension 62 having ground engaging cleats 63 and supported by a link 64, the arrangement being such that it imparts a lifting action to the pan when the tread extension rolls over the ground.

The forward rail 41 of the frame at a point slightly to the left of its longitudinal center (with the observer facing forward) is provided with a bifurcated bracket 65, the forward end of which converges into a vertical journal bearing 66 which mounts the upper end 67 of a caster pintle 68 which carries a forward caster wheel 69. The caster wheel is supplemented by outer and inner ground wheels 70 and 71 which are journaled upon short stud shafts 72 outwardly projecting from the brackets 44 upon the side rails 40, which arrangement, it will be observed, places the ground wheel axis within the plane of the main frame while locating the axis of movement for the pan at a higher point which will vary up and down in conformity with the vertical and rotative movements imparted to the pan by the ground contact of the tread members.

The pan is additionally supported between the tread members by the provision of a pair of rearwardly diverging brace bars 73 which extend from the upper rear rims of the pan to the proximate portions of the tread members to which the outer ends are riveted. The pan is reinforced along its upper edges by the provision of side bars 74, the forward ends of which connect directly to the flat sections 60 of the pan, the configuration of the pan being such as to completely bridge the space between the tread members at this point. The pan is normally supported in the horizontal or prostrate position by the provision on each side of a stop finger 75, which fingers are secured to brace bars 76 which are bowed backwardly from the forward flat portions 60 of the tread members so as to bring these points of support for the pan slightly to the rear of the forward or enlarged open end of the pan when in receiving position.

The stop fingers 75 rest upon and are supported, on each side, by latch plates 77 which are pivotally mounted upon the respective side rails 40 and extend transversely thereof. The latches are adapted to be actuated in unison by means of draw rods 78 connected by cranks 79 on the opposite ends of a rock shaft 80 which extends transversely across the front of the machine and is journaled near each end within journal bearings 81 (see Fig. 6) mounted upon a pair of upwardly and obliquely extending brace bars 82 which extend from the front cross rail 41, near the outer end thereof, to the top rail 83 of a front arch having depending legs 84 which are entered into socket fittings 85 on the side rails 40, (see Fig. 3 and 6).

The means for actuating the rock shaft to draw back the pan supporting latches 77 will be presently described. The front arch 83 is braced by the provision of forwardly and outwardly converging braces 86, the forward ends of which unite with and are secured to the journal mounting 66 for the forward caster. This arrangement gives great rigidity, combined with comparative lightness to the frame, and centers the draft strains mainly within the plane of the main frame which avoids torsional or similar strains, and at the same time, affords ample clearance for the rotative movements of the pan.

*The elevator.*

The elevator mechanism is designed to deliver bundles with their butt ends forward, and to straighten out the position of the bundles, so that they will fall into the pan in true fore and aft alignment with the longitudinal axis of the pan. This straightening or corrective action of the elevator mechanism is desirable for the reason that the bundles delivered from the binder are sometimes in a more or less disarranged condition and if delivered directly into the pan would tend to build up the shock in a more or less haphazard manner.

The elevator is mounted upon a rectangular frame comprising a longitudinally extending rail 87 which merges at its ends into connecting arms 88, the ends of which are bolted or otherwise secured to the fittings 85 which support the vertical legs 84 of the front arch.

As shown in Fig. 2, the plane of the elevator frame is slightly depressed toward the binder side and the elevator frame is additionally supported by the provision of an end upright 89 (see Fig. 2) which is bolted to the front arm 88 and extends upwardly to a high elevation and connects with a longitudinally extending top rail 90 (see Fig. 4) which is downturned at its rear end 91 to make connection with the rear arch 42 at the inner corner thereof. The upright bar 89 also makes connection with an intermediate fore and aft rail 92 (see Fig. 4) which serves as a support for a series of standards 93 (see Fig. 5) which support the upper ends of a plurality of curved deck rails 94, the lower ends of which are secured to the elevator frame rail 87. The deck rails in unison present a surface curving upwardly and toward a point above the pan when in prostrate receiving position. The deck rails are supplemented by a series of upper tines 95 which are supported in spaced relation to the deck rails, being hung from the fore and aft top rail 90 and provided with extensions 96 downcurving over the open side of the pan.

Each of the deck rails, at a point about midway of its length is provided with a pivotally mounted upwardly projecting supporting finger 97, the several fingers being in aligned relation and each being of the form and shape illustrated in Fig. 16, that is to say, each of the fingers consists of a supporting member 98 and a pivoting member 99, the two members being continuously formed.

The supporting member 98 terminates in a hook 100 which extends under the edge of the curved deck rail 94 and has connected therewith a spring 101, the opposite end of which is connected with a bracket member 102 which serves as a pivotal mounting for the inturned end 103 of the pivoting member 99. The arrangement is one which permits the finger to yield for the passage of bundles upwardly over its surface, but retards the return of the bundles after they have passed the finger, and all of the fingers being in horizontally aligned relation serve to straighten out and correct the position of the bundles prior to their final delivery into the pan. The elevation of the bundles is effected through the medium of a plurality of curved pusher arms 104, the acting ends of which are aligned with the group of deck rails and operate within spaces intermediate the deck rails.

In the construction shown five deck rails are provided which afford spaces for the oscillation of four of the pusher arms. Each pusher arm is provided with upper and lower pivoted fingers 105 and 106, the construction of which and mounting for which are in all respects similar to the construction illustrated in Fig. 16, which figure, it will be understood, applies equally to these pusher arm fingers. The lower ends 107 of the pusher arms extend at an angle to the upper ends, being bent toward the body of the machine, and the ends or extensions 107 of the pusher arms are pivoted intermediately upon an upper bail 108 (see Fig. 3) provided with angularly disposed ends 109 which are pivotally mounted within fittings 110 mounted upon the inner frame rail 40 near the forward and rear ends thereof. The lower ends of the pusher arm extensions are pivotally mounted upon a lower bail 111 having ends 112 which are likewise pivoted to the same fittings 110, but on axial centers slightly below the centers for the upper bail. As a result of this arrangement, the pusher arms will move in curvilinear paths substantially coincident with the plane of the elevator deck as indicated by dotted lines in Fig. 2.

The means for oscillating the pusher arms will now be described. The forward end 109 of the upper bail 108 has mounted thereon a bracket 113 which has pivoted thereto a link 114, the upper end of which is pivotally connected to a crank 115 carried by a shaft 116 illustrated in detail in Figs. 24, 25 and 26. This shaft is mounted within a rectangular frame 117 supported at one corner upon the upright leg 84. The shaft is journaled through the ends of the frame and has loosely mounted thereon a sprocket wheel 118, which constantly is driven by a chain 119 leading to a sprocket 120 which is fixedly connected to the inner ground wheel 71 (see Fig. 1).

The sprocket wheel 118 has clutch teeth 121 which co-operate with clutch teeth 122 on a driven clutch collar 123 which is slidably pinned to the shaft 116 (see Fig. 26), being backed by a coil spring 124ª which tends to hold the clutch elements in clutching relation. The clutch collar 123 lies in facial contact with a clutch actuating yoke 124 provided with cam flanges 125 which are adapted, when the yoke is thrust upwardly, to engage with a pair of lugs 126 inwardly extending from the sides of the frame 117, and in riding under said lugs, the yoke will be thrust laterally against the tension of the spring 116 thereby serving to break the clutch and interrupt the rotative movements of the shaft 116.

The throw of the crank 115 is such that with each rotation of the shaft 116, the pusher arms will be lifted from the position indicated in full lines in Fig. 2 to the position indicated in dotted lines, which will bring the lowermost fingers 106 above the line of arresting fingers 97 on the elevator deck with the result that a bundle of grain deposited upon the lowermost series of pusher fingers 106 will be elevated sufficiently to clear the arresting fingers which will yield to permit such clearance. Thereafter the pusher fingers will recede and the bundle will be arrested and held in the midway position, and this arresting of the bundle will serve to straighten it into a true fore and aft direction. Upon the next movement of the pusher fingers, the bundle thus previously arrested will be carried on up to the tines 95 and 96 and thrown downwardly and outwardly into the center of the pan, a second bundle meanwhile being elevated to the arresting position.

In this way, the elevator serves to advance the bundles by stages to the discharging position which is a highly desirable method of feeding the bundles in that it corrects the position of the bundles, and at the same time obviates the necessity for using an elevator having an excessively wide range of movement which would have to operate in a somewhat violent manner to complete its range of movements within the time allowed for the delivery of bundles.

The present method insures compactness of structure and relative ease and certainty of movement, relieves the machine from excessive racking movements and enables it to be located in close proximity to the binder, and at the same time secures the advantage of a positive thrust being imparted to the bundles at the point of ejectment into the pan which is highly desirable in order to secure a correct positioning of the bundles in the building up of the shock.

*The butting board.*

The butting board of the present invention is mounted in such a manner as to accommodate itself to the movements of the pan during the up ending of the shock. It is to be observed that during the accumulation of bundles, the forward end of the pan occupies a position parallel to and in close proximity to the butting board. This position of the butting board with relation to the pan, while proper and necessary during the accumulation of the bundles into a shock, cannot properly be maintained during the up ending of the completed shock, and the present invention provides mechanism for correlating the movements of the butting board to the movements of the pan.

The butting board consists of a main upper section 127, to the lower edge of which is hinged a flap section 128, the joint between the two sections being about midway of the depth of the pan measured at its forward end. The upper section is suspended from a pair of hangers 129, the upper ends of which are pivoted from standards 130 mounted upon the forward arch 83. The hangers are bowed forwardly to clear the arch, as indicated in Fig. 6.

The upper section of the butting board has secured to its forward side a pair of bracket bars 131 which embrace the rearwardly extending arm 132 of a rock shaft 133. The arm 132 terminates in the upwardly bent finger 134 to which is secured a coil spring 135, the rear end of which is connected to the butting board at a point below the connection for the bracket bars 131 (see Fig. 3).

The rock shaft 133 is journaled near its left end within a journal bracket 136 mounted upon the left hand brace bar 82 and is journaled near its opposite end within a journal bracket 137 mounted upon a center brace bar 138, (see Figs. 1 and 3). The rock shaft at its right hand end carries a depending crank finger 139 which has pivoted thereto a link 140, which latter is pivoted at its lower end to the forwardly extending arm 141 of a bell crank lever which is pivoted upon the front cross rail 41. The lower arm 142 of the bell crank lever has pivoted thereto an upper link rod 143 and a lower link rod 144, the former of which is hooked to the butting board 127 near its lower edge, and the latter of which is hooked to the lower edge of the flap or gate (see Fig. 6).

The shaft 133 at its left end carries a crank arm 145 which pivots to a rod 146 connecting with the clutch yoke 144, the arrangement being such that when the clutch yoke is thrust upwardly to break the clutch which oscillates the elevator pusher arms, the butting board will be drawn forwardly away from the pan, that is, from the position indicated in Figs. 6 and 7, to the position indicated in Fig. 8. This is due to the rocking of the shaft 133 which swings the lower arm 142 of the bell crank outwardly thereby drawing back the lower edge of the butting board and the lower edge of the flap but in unequal degree, so that the flap will be swung forwardly out of the plane of the butting board, and thereby increase the degree of clearance afforded to the upper edge of the base of the shock as it sweeps downwardly across the face of the butting board prior to the deposition of the shock upon the ground.

The rocking of the shaft 133 will also swing forwardly and upwardly the arm 132 which draws back the butting board against the tension of the spring 135, the latter being put under tension by the movement of the upper finger 134 relatively to the butting board as the parts move from the position of Fig. 3 to the position of Fig. 6. The butting board will thus be held by a sort of floating connection and be free to yield slightly under spring tension in case such yielding is required to permit the base of the descending shock to fully clear the butting board. In this way, the butting board with its attached flap or gate assume the positions necessary to accommodate the positions assumed by the shock during the period of its discharge by the pan.

*The compressor wings.*

After the accumulation of the bundles necessary to constitute a shock, it is desirable to compress the bundles, first, for the purpose of imparting to the bundles the configuration of a shock having a closely compressed waist and the widely extended base; secondly, for the purpose of holding the bundles during the tilting of the pan; and, thirdly, for the purpose of forcing the shock firmly down against the ground at the instant of its deposit.

In devising a compressor adapted to perform these functions, it is also necessary to so construct and operate the compressor that it will serve to steady the shock against toppling as the shock is released from the pan and will in no wise interfere with the passage of the pan over the top of the deposited shock. The compressor of the present invention conforms to the above requirements.

The compressor comprises an inner compressor wing 147 and an outer compressor wing 148. The compressor wings normally occupy the open positions indicated in Figs. 1, 2, 6, 7 and 11. It will be observed from these figures that the inner compressor wing is narrower than the outer wing and normally lies back or away from the inner edge of the pan, while the outer wing stands in a generally vertical relation to the outer edge of the pan. Both of the wings are of a shape corresponding to elements of the surface of a cone and constitute in effect continuations of the conical wall of the pan, being concave on the inner or acting faces. The two wings are of equal length, extending about two-thirds the distance from the rear to the front of the pan, and each of the wings is wider at its forward end than at its rear end. It will be observed from the dotted lines of Fig. 11, that when the wings are in closed relation, the edges are brought into substantial contact with one another to furnish a complete enclosure for embracing the bundles of grain constituting the shock.

The configuring of the forward edges of the respective wings is of primary importance, since these edges are designed to bear against the waist of the shock during the tilting operation and momentarily thereafter in order first to cause a spreading of the base of the shock, and, second, to impart a steadying movement at the moment the shock is grounded and the pan begins to move over the shock.

The forward edge of the inner wing comprises a straight inner section 149 which merges into a rearwardly and outwardly curving section 150, and the outer edge 151 of the wing extends in a converging direction towards the inner edge of the pan to which the wing is pivoted. The forward edge of the outer wing 148 likewise comprises a straight inner edge section 152 which merges into a curving section 153, which in turn merges into the outer edge 154. As a result of this configuration, when the wings are closed, the forward edges will assume substantially the position indicated in dotted lines in Fig. 1, from which it will be apparent that the waist of the shock will be engaged and compressed by the curving edges of the wings which occupy a position longitudinally removed from the axis of revolution of the pan, so that after the pan has reached the vertical position indicated in Fig. 9, the acting edges of the wings will begin to sweep rearwardly or in a line of movement opposite to the forward advance of the shocker as a whole, so that the result will be substantially a momentary arrest of translatory movement of this portion of the mechanism which bears firmly against the waist of the shock and serves to steady it against toppling forward due to its acquired momentum.

The means for timing the action of the wings and imparting the necessary opening and closing movements thereto will now be described. Each of the wings is mounted upon an obliquely extending shaft 155, which shafts are journaled at their rear ends within journaled brackets 156 secured to the respective edges of the pan (see Fig. 1). The forward end of each shaft is journaled within a sleeve 157, which sleeves are likewise mounted upon brackets 158 secured to the pan edges near the front ends thereof, and each shaft in advance of the sleeve is provided with a bevel gear segment 159 which meshes with a bevel gear segment 160 mounted upon a transversely extending stub shaft 161 likewise carried by the bracket 158 (see Figs. 12 and 17).

The means for imparting rotation to the driving bevel segments are located upon the right hand side of the machine, and these will now be described in detail with particular reference to Figs. 12, 17 and 18.

The right hand or outer bevel segment 160 is provided with an upwardly extending arm 162 which is bifurcated at its outer end to receive the upper end of a spring frame 163 which is pivoted on a cross pin 164. The spring frame has slidably entered therethrough a rod 165 which is surrounded by a spring 166 bearing against the pin 167 (see Fig. 18), at one end, and against the head wall 168 at the other end. The rod 165 connects with an eccentric strap 169 composed of a center section 170 and flange sections 171 (see Fig. 19) which engage an eccentric 172 which is freely mounted upon the outer end 51 of the pan shaft. The eccentric is bolted to a sprocket wheel 173 which is engaged by an endless chain 174 passing under an idler 175 mounted upon a tension bar 176 and controlled by a spring 177 secured to the outer side rail 40.

Referring particularly to Fig. 13, the chain 174 is carried around a sprocket wheel 178 keyed upon the shaft 80 by a key 179, which also keys a plate 180 provided on its outer face with a boss 181 which carries a pin 182 upon which is fulcrumed a lever 183 provided at its rear end with a roller 184 adapted to co-act with the scalloped wall 185 of a driving clutch element 186 which is freely mounted upon the shaft 80 and is bolted to a driving sprocket wheel 187, engaged by an endless chain 188, which is carried around a sprocket wheel 189, journaled upon the stub shaft 190 which mounts the outer ground wheel 70 with which the sprocket wheel 189 is rigidly engaged. The chain 188 is carried over a tension roller 191 mounted upon an arm 192 and controlled by a spring 193 (see Fig. 12).

The plate 180 is provided at its forward edge with a notch 194 which occupies a position adjacent the forward end of the lever 183 (see Fig. 14), which outer end is offset, as in Fig. 15, to clear the inner edge of the driving clutch element 186.

Referring now to Figs. 20, 21 and 22, it will be noted that the outer end of the shaft 80 is journaled upon a standard 195 and immediately below and in parallel relation to the shaft 80 is a rock shaft 196 which is provided at its outer end with an upturned arm 197, which sockets an outwardly bent finger 198, which overlies the upper edge of a detent 199 provided at its lower end with a weight 200. The detent is pivoted upon a pin 201 entered through the arm 197.

The detent co-acts with a roller 202 journaled within the bifurcated upper end of a lever 203 pivoted upon the front frame cross rail 41 and normally retracted by the tension of a spring 204. The lever 203 is provided with a depending lower leg 205 which is engaged by a draw rod 206, the rear end of which is pivoted to the lower leg 207 of a bell crank 208, the forward end 209 of which is adapted to be engaged by the lower end of a trip lever 210 which is adapted to engage with a notch 211 in the rear edge of the outer arcuate guide bar 45. The trip lever 210 is pivoted upon the outer end 51 of the pan shaft and the upper end of the lever is normally forced toward the rear by the action of a push spring 212. The upper end of the latch lever is engaged by a link 213 which leads to and connects with the upper arm 214 of a cam lever 215 pivoted to a pin 216 carried by the outer guide head 46. The cam lever is provided with a cam finger 217 which co-acts with the edge of a cam plate 218 which is pinned to the shaft 51 and rotates therewith and is configured to throw forward the cam finger and disengage the latch lever at the proper time to permit the pan to fall, and thereby bring the tread members into contact with the ground for the purpose or rotating the pan.

In order to secure a like operation of parts on the opposite or inner side of the machine, the pin 164 which is carried by the arm 162 has pivoted thereto a rod 219, the lower end of which is hooked to a crank 220 on the end of a transversely extending rock shaft 221 (see Figs. 3 and 12), which runs transversely under the pan near the center thereof, and which is journaled at its ends within standards 222 supported upon the proximate flat sections 59 of the tread members. The shaft 221 carries a crank 223 at its inner end, which crank has engaged therewith a rod 224 connecting with an arm 225 upstanding from a segment 226 which is substantially a counterpart of the segment 160 on the opposite side of the machine. The segment 226 co-acts with the left hand bevel gear segment 159 mounted upon the left hand wing shaft 155, so that the two shafts will be operated in unison and rotate in opposite directions to cause the wings to simultaneously approach and recede from one another, the gear ratio in the two instances being such as to impart a greater degree of movement to the left hand wing in order to accommodate the greater range of operation of this wing.

The shaft 196 at its inner end is provided with a crank 227 (see Figs. 2 and 3) which has hooked thereto a main operating rod 228 provided near its upper end with a shoulder 229 (Figs. 5 and 28) which shoulder when drawn forward is adapted to be engaged by a lug 230 on the end of the shaft 116. The operating rod 228 is guided within a slotted guide clip 231 mounted upon the vertical arch leg 84 in position to permit the rod to be drawn forward by a pull on an operating cord 232, so that when the cord is pulled, the shoulder will be drawn into position to be engaged by the lug and lifted, which movement initiates the train of operations presently to be described.

The latch mechanism comprising the cam plate 218, the cam lever 214, the cam finger 217, the latch 210 and connecting link 213 for latching the pan supports to the segmental guide bars 45 are all duplicated on the left hand side of the machine as indicated in Fig. 31. Pivoted co-axially with the left hand cam lever 214 is a bell crank lever 233, the upper arm of which connects with a draw rod 234 pivoted at its forward end to a crank 235 on the rock shaft 133 which controls the movements of the butting board, (see Figs. 29, 30 and 32). The lower arm 236 of said bell crank lever co-acts with a disk 237 keyed to the pan axle 51 and provided in its periphery with a notch 238 so arranged that the upper edge of the notch will normally engage the arm of the bell crank (see Fig. 32). As the axle begins to revolve, the upper arm of the bell crank will be drawn back, as in Fig. 30, thereby imparting a pull to the rod 234 which imparts a rocking movement (counterclockwise in Fig. 3) to the shaft 133 which controls the butting boards.

*General sequence of operation.*

After the desired number of bundles have been deposited in the pan, the operator imparts a pull to the cord 232 which initiates the operations required in depositing the shock upon the ground and returning the pan to its normal position. By pulling on the cord, the shouldered operating rod 228 is brought into co-acting relation with the lug 230 on the shaft 116 which during the accumulating period has been clutched to the sprocket wheel 118 constantly driven from the inner ground wheel. With the shaft 116 thus in operation, the lug will in regular course lift up the rod 228 which rocks the shaft 196 for the purpose of tripping the one revolution clutch at the front outer corner of the frame. This tripping action is occasioned by the movement imparted to the weighted detent 199 by the forward rocking of the arm 197.

This rocking causes the hooked finger 198 to bear down upon the detent and swing its forward end downwardly (Fig. 21) which thrusts forwardly the lever 203 into position to clear the notched plate 180, and also the forward end of the arm 183. The arm 183 being thus momentarily released, its forward end will be drawn down by the action of a spring 239 (see Fig. 14) which will lift the roller at the inner end of the lever into engagement with one of the scallops in the rim of the constantly rotating clutch element 186. The plate 180 and arm 183 being thus clutched will begin to rotate counterclockwise (see Figs. 20, 21 and 22) and the operator's draw cord being meanwhile released will permit the lever 203 to assume its normal position as indicated in Fig. 22, so that after the clutch has begun to rotate it will continue its rotation until the clutch lever 183 again finds the lever 203 so positioned as to effect a disengagement of the clutch elements.

As soon as the clutch is closed, rotation in a clockwise direction (see Fig. 12) will be imparted to the sprocket wheel 173 which is rigidly united to the eccentric 172. This initiates a revolution of the eccentric around the pan shaft 51 and thus begins to draw back on the rod 165 and connections which impart a turning movement to the gear segment 160 on the right hand or outer side of the machine. Like movements are imparted to the gear segment on the inner side of the machine through the connections 219, 220, 221, 222, 223, 224 and 225. These gear movements cause the outer and inner wings to close in toward each other, so that the bundles of grain will be clasped and compressed within the pan prior to the beginning of the pan tilting movements.

The rotation of the clutch plate 180 imparts rotation to the shaft 80 having thereon the cranks 79 at each end, which cranks control the operation of the latch plates 77 which support the tread members for the pan. The initial movement of the shaft 80 will impart a rear thrust to each of the rods 78 which will have no effect in releasing the pan latches 77, but after the rotation of the shaft 80 has progressed through half a revolution from the positions shown in Fig. 12, a point will be reached where a forward pull will be imparted to each of the rods 80, and in due course thereafter the latches will be drawn away from under the stops 75 allowing the forward corners of the tread members to drop from the positions shown in Figs. 5, 6 and 7 to the position shown in Fig. 8, in which latter position the corners of the treads will engage the ground, so that the pan will begin to rotate.

The rotation of the pan will impart like rotation to the ends 51 of the pan shaft, which constitute the axis of the pan, and the outer and inner cam plates 218 will begin to rotate in a clockwise direction (see Fig. 12) which in due course will throw back the cam levers 214, thereby releasing the respective latches 210 from engagement with the guide segment bars 45, so that thereafter the pan will be freed from all vertical support afforded by the main frame of the machine, and will roll over supported only upon the tread members, and be given a path of movement conformable to the configuration of the tread members.

If the main clutch 180 were permitted but a single revolution, insufficient time would be afforded to permit the pan to complete its movements, and in order to forestall a throwing out of the clutch after one rotation, the bell crank 208 is provided, and the movements of the pan are so co-ordinated that prior to the completion of the first clutch rotation, the pan and parts associated therewith will be dropped sufficiently below the normal position to bring the lower end of the latch 210 into engagement with the upper arm 209 of the bell crank 208. This engagement results in a pull on the rod 206 which thrusts forward the lever 203 into the position indicated in Fig. 21, thereby permitting the clutch elements to clear and the clutch to continue throughout a second rotation.

The gear ratio between the clutch sprocket 178 and the driven sprocket 173 is such that the wings will have moved inwardly to their extreme position shortly prior to the completion of the first clutch rotation. At this stage, the pan latches will have been released and the pan will begin to rotate. A suitable ratio between the ground wheels and the tread wheels is observed, so that the rotation of the pan will practically keep pace with the rotation of the eccentric 172, with the result that there will be little, if any, relative rotation between the eccentrics and the eccentric strap 169 which controls the movements of the wing operating gear segments. By proper observance of ratios, the wings may be held in closed position during the time the shock is being up ended and permitted to open during the return movement of the pan after the shock has been delivered.

When the forward end of the pan falls to the position indicated in Fig. 8, it will be noted that the forward lower corners of the treads are in contact with the ground, considerably in advance of the pivotal center of the pan. As a result, the continued advance of the machine with the treads resting upon the ground will occasion an initial elevation of the pan axis, but the continued movement of the pan to the position shown in Fig. 9 will bring the sections 60 of the treads into flatwise engagement with the ground, thereby resulting in a lowering of the pan axis at this stage of the operation.

The initial lifting of the pan, with the shock tightly clasped around its middle by the wings, and the subsequent dropping of the pan bodily as it approaches its vertical position, results in a jamming down of the shock forcibly upon the ground while still tightly clasped and held within the pan. Thereafter the pan continues its movement as in Fig. 10 at which point the tread extensions 62 come into play and tend to lift the pan axis back to its initial position for the purpose of elevating the enlarged end of the pan sufficiently to clear the deposited shock.

It will be observed from Fig. 10 that at this stage the acting ends of the wings will bear against the deposited shock at a point near the middle thereof and serve to prevent toppling forward of the shock as the pan in its inverted position moves over the top of the shock. After the shock has been deposited, the pan rolls over on the rounded portion of the treads until it swings back to its original prostrate position at which point it will again be engaged and supported by the latches 77, which at this stage are moved to position to support the pan. During the final portion of the return of the pan, it will be assisted by the pull of a heavy coil spring 240 connected to a cross bar 241 which is bolted to the left hand cam plate 218, in such position that the spring will be tensioned as the pan is being up ended with the weight of the shock to assist in the movement of the pan, and so that the tension thus stored in the spring at this stage will be available to assist in carrying the pan over and back to normal position after the shock has been discharged.

The shape of the tread members is such that the first or initial impetus for rotating the pan will be derived from the engagement of the right angle corners of the tread members with the ground as in Fig. 8. The abrupt angles thus presented to ground contact will afford an instant and effective ground engagement which will result in an initial lifting of the pan axis, and a subsequent dropping thereof to the lowermost position just at the time when the shock is assuming its vertical position, so that the entire weight of the pan and treads will be imposed upon the shock at the very instant it is up ended, which pressure has the effect of spreading the base of the shock to the degree required to insure satisfactory results. The machine as a whole is of extremely rugged construction without being unduly ponderous.

Although the invention has been described with great particularity as to detail, it is obvious that many of the parts might be changed or modified without departing from the spirit of the invention.

We claim:

1. In a grain shocker, the combination of a frame, a tiltably mounted shock container, a compressor plate closable against the head portion of the shock, a ground engaging tread member for tilting the shock container, and means for closing the compressor plate before the container is tilted, substantially as described.

2. In a grain shocker, the combination of a frame mounted upon a ground wheel, a tiltably mounted shock container, a compressor plate closable against the head portion of the shock, a tread member associated with the shock container and adapted to be brought into ground engagement, and means actuated by the ground wheel for closing the compressor plate before the container is tilted, substantially as described.

3. In a grain shocker, the combination of a frame, a tiltably mounted trough shaped shock container open on one side to receive bundles of grain, compressor wings mounted one on each side of the shock container, said wings being of less length than the container and closable against the head portion only of the shock, means for tilting the shock container, and means for closing the compressor wings toward one another before the container is tilted, substantially as described.

4. In a grain shocker, the combination of a frame, a tiltably mounted shock container open on one side to receive bundles of grain, compressor wings mounted one on each side of the shock container, means for tilting the shock container, and means for closing the compressor wings to compress and hold the upper end of the shock during the tilting operation, substantially as described.

5. In a grain shocker, the combination of a frame, a shock container tiltably mounted on the frame and having one side open to receive bundles of grain delivered from above, companion compressor wings hinged one upon each edge of the open side of the shock container, said wings being mounted in position to present their normally forward edges against the waist of the shock when closed, means for closing the compressor wings in unison prior to the delivery of the shock, and means for tilting the container, substantially as described.

6. In a grain shocker, the combination of a frame, a shock container tiltably mounted on the frame and having one side open to receive bundles of grain delivered from above, companion compressor wings hinged one upon each edge of the open side of the shock container, said wings being mounted in position to present their normally forward edges against the waist of the shock when closed, means for closing the compressor wings in unison prior to the delivery of the shock, and a tread member associated with the container and adapted to be dropped into ground engagement to tilt the container, substantially as described.

7. In a grain shocker, the combination of a frame mounted on a ground wheel, a tiltable shock container mounted upon the frame and adapted to be moved vertically with respect thereto, a tread member associated with the container, means for releasing the container and tread member to bring the latter into ground contact, and compressor wings mounted upon the container and adapted to be moved to compressing position prior to the release of the container, substantially as described.

8. In a grain shocker, the combination of a frame mounted upon a ground wheel, a shock container in the form of an open sided pan enlarged at its normally forward end, a pivotal mounting for the pan, a tread member fixedly associated with the pan, means for releasing the tread member to bring its periphery into ground engagement, a pair of compressor wings hinged one on each side of the container and terminating near the middle portion thereof and adapted when closed to compress the head portion of a contained shock and adapted to present their normally forward edges against the waist of the shock at a point distant from the axis of movement of the pan to impose on said edges a backward movement during the up-ending of the shock to effect a steadying thereof, substantially as described.

9. In a grain shocker, the combination of a frame mounted upon a ground wheel, a shock container in the form of an open sided pan enlarged at its normally forward end, a pivotal mounting for the pan, a tread member fixedly associated with the pan, means for releasing the tread member to bring its periphery into ground engagement, a pair of compressor wings hinged one on each side of the container and terminating near the middle portion thereof and adapted when closed to compress the head portion of a contained shock and adapted to present their normally forward edges against the waist of the shock at a point distant from the axis of movement of the pan to impose on said edges a backward movement during the up ending of the shock to effect a steadying thereof, and means carried by the ground wheels for closing the compressor wings prior to the tilting of the shock container, substantially as described.

10. In a grain shocker, the combination of a frame mounted upon a ground wheel, a shock container in the form of an open sided pan enlarged at its normally forward end, a pivotal mounting for the pan, a tread member fixedly associated with the pan, means for releasing the tread member to bring its periphery into ground engagement, a pair of compressor wings hinged one on each side of the container and terminating near the middle portion thereof and adapted when closed to compress the head portion of a contained shock and adapted to present their normally forward edges against the waist of the shock at a point distant from the axis of movement of the pan to impose on said edges a backward movement during the up ending of the shock to effect a steadying thereof, and means carried by the ground wheel for closing the compressor wings prior to the tilting of the shock container, and adapted to maintain said wings in closed relation during the deposition of the shock on the ground, substantially as described.

11. In a grain shocker, the combination of a frame mounted upon a ground wheel, an open sided pan carried by the frame and provided with an axle, means for journaling said pan axle in varying positions of vertical adjustment, and a tread member fixedly associated with the pan and having two flat sections in angular relation to one another, and a connecting curved section, substantially as described.

12. In a grain shocker, the combination of a frame mounted upon the ground wheel, an open sided pan carried by the frame and provided with an axle, means for journaling said pan axle in varying positions of vertical adjustment, and a tread member fixedly associated with the pan and having two flat sections in angular relation to one another, and a connecting curved section, the angle between the flat sides being coincident with the normally forward lower edge of the pan, substantially as described.

13. In a grain shocker, the combination of a frame mounted upon a ground wheel, an open sided pan carried by the frame and provided with an axle, means for journaling said pan axle in varying positions of vertical adjustment, and a tread member fixedly associated with the pan and having two flat sections in angular relation to one another, and a connecting curved section, the angle between the flat sides being coincident with the normally forward lower edge of the pan, and an outwardly projecting tread extension secured to the tread at a point adjacent the normally upper forward edge of the pan, substantially as described.

14. In a grain shocker, the combination of a frame mounted upon a ground wheel, a pan of half frustrum conical formation with its open side normally up and its enlarged end extending forwardly, an axle for the pan, means for journaling said axle in variable positions of vertical adjustment, and a tread member fixedly associated with said pan and provided with a flat side in substantial parallelism with the edge of the enlarged forward end of the pan, substantially as described.

15. In a grain shocker, the combination of a frame mounted upon a ground wheel, a pan of half frustrum conical formation with its open side normally up and its enlarged end extending forwardly, an axle for the pan, means for journaling said axle in variable positions of vertical adjustment, a tread member fixedly associated with said pan and provided with a flat side in substantial parallelism with the enlarged forward end of the pan, and a flat side in angular relation to the flat side first mentioned and extending substantially parallel with the upper rim of the pan, and a curved section connecting the non-adjacent ends of the two flat sections, substantially as described.

16. In a grain shocker, the combination of a frame mounted upon a ground wheel, a pan revolvably mounted within the frame in such manner as to permit vertical variation of the axis of movement of the pan, a pair of tread members rigidly associated with the pan and each provided with a flat side in substantial parallelism with the discharging end of the pan, substantially as described.

17. In a grain shocker, the combination of a frame mounted upon a ground wheel, a pan revolvably mounted within the frame in such manner as to permit vertical variation of the axis of movement of the pan, a pair of tread members rigidly associated with the pan and each provided with a flat side in substantial parallelism with the discharging end of the pan, and a flat side connecting with the first and extending longitudinally of the pan, and a curved section connecting the non-adjacent ends of the flat sections, substantially as described.

18. In a grain shocker, the combination of a frame, a tiltable shock container open at its normally forward end and prostrate when in receiving position, and a butting board suspended across the forward end of the container and provided with a folding section, and means for moving said folding section forwardly away from the container during the discharging operation, substantially as described.

19. In a grain shocker, the combination of a frame, a tiltable shock container open at its normally forward end and prostrate when in receiving position, a butting board provided with a folding lower section, a link support for the main section of the butting board, and means for drawing the folding section away from the container during the discharging operation, substantially as described.

20. In a grain shocker, the combination of a frame, a pan tiltably mounted thereon and open at its ends and prostrate when in receiving position, a butting board in advance of the pan and provided with a hinged lower section, a link support for the upper section, and means actuated concurrently with the tilting of the pan for swinging the lower section of the butting board away from the pan during the discharging operation, substantially as described.

21. In a grain shocker, the combination of a frame supported upon a ground wheel, a pan revolvably mounted upon the frame in a manner to permit vertical variation of the axis of the pan, a tread member rigidly associated with the pan, means for holding the tread member and pan in elevated position during the building up of the shock, a butting board in advance of the discharging end of the pan mounted to permit movement away from the pan during the discharging operation, and means associated with the pan releasing means for retracting the butting board coincidentally with the release of the pan, substantially as described.

22. In a grain shocker, the combination of a frame supported upon a ground wheel, a pan revolvably mounted upon the frame in a manner to permit vertical variation of the axis of the pan, a tread member rigidly associated with the pan, means for holding the tread member and pan in elevated position during the building up of the shock, a butting board in advance of the discharging end of the pan mounted to permit movement away from the pan during the discharging operation, and means associated with the pan releasing means for retracting the butting board coincidentally with the release of the pan, said means being actuated by the rotating movement of the pan, substantially as described.

23. In a grain shocker, the combination of a frame, a pan tiltably mounted upon the frame and open at its normally upper side to receive bundles of grain delivered thereinto, an elevator associated with the pan and constituting a deck provided with a yieldable arresting finger, a pusher arm associated with said deck and provided with a pair of yielding fingers in spaced relation with respect to the point of discharge for bundles into the pan, and means for moving the pusher arm toward and from the discharging point, each movement serving to carry the rearmost finger past the arresting finger to cause an arrest of bundles and a subsequent engagement thereof by the uppermost finger on the pusher arm for final discharge into the pan, substantially as described.

24. In a grain shocker, the combination of a frame, a pan tiltably mounted within the frame and open on its normally upper side to receive bundles of grain delivered thereinto from above, an elevator located in the inner side of the frame and comprising a deck of convexly curved formation, curving upwardly and outwardly toward the pan, a row of arresting fingers mounted upon the deck in a manner to permit forward yielding thereof, a plurality of pusher arms of arcuate formation mounted to move back and forth within a curvilinear plane substantially concentric with the plane of the deck, upper and lower sets of forwardly yielding fingers carried by the pusher arms, and means for oscillating the pusher arms sufficiently to carry the lowermost fingers past the arresting fingers on the deck to cause an initial arrest of bundles midway of the deck and a subsequent engagement with and discharge of the arrested bundles by the uppermost pusher arm fingers, substantially as described.

25. In a grain shocker, the combination of a frame, a pan tiltably mounted within the frame and open on its normally upper side to receive bundles of grain delivered thereinto from above, an elevator located on the inner side of the frame and comprising a deck of convexly curved formation, curving upwardly and outwardly toward the pan, a row of arresting fingers mounted upon the deck in a manner to permit forward yielding thereof, a plurality of pusher arms of arcuate formation mounted to move back and forth within a curvilinear plane substantially concentric with the plane of the deck, upper and lower sets of forwardly yielding fingers carried by the pusher arms, and means for oscillating the pusher arms sufficiently to carry the lowermost fingers past the arresting fingers on the deck to cause an initial arrest of bundles midway of the deck and a subsequent engagement with and discharge of the arrested bundles by the uppermost pusher arm fingers, such means being in operative connection with the ground wheels, substantially as described.

26. In a grain shocker, the combination of a frame mounted upon ground wheels, a pan tiltably carried by the frame, compressor wings mounted upon the pan and adapted to be folded downwardly to compress bundles within the pan, an elevator secured to the inner side of the frame and comprising a deck extending upwardly and outwardly toward and above the open side of the pan when in receiving position, a pusher arm mounted to oscillate back and forth with respect to said deck for feeding bundles upwardly thereon, means in train with one of the ground wheels for actuating said pusher arm, means in train with one of the ground wheels for closing said compressor wings, and connections between said two last named actuating means for stopping the movement of the pusher arm concurrently with the closing movement of the compressor wings, substantially as described.

27. In a grain shocker, the combination of a frame mounted upon ground wheels, a pan tiltably carried by the frame, compressor wings mounted upon the pan and adapted to be folded downwardly to compress bundles within the pan, an elevator secured to the inner side of the frame and comprising a deck extending upwardly and outwardly toward and above the open side of the pan when in receiving position, a pusher arm mounted to oscillate back and forth with respect to said deck for feeding bundles upwardly thereon, means in train with one of the ground wheels for actuating said pusher arm, means in train with one of the ground wheels for closing said compressor wings, and connections between said two last named actuating means for stopping the movements of the pusher arm concurrently with the closing movement of the compressor wings, and means for thereafter tilting the pan, substantially as described.

28. In a grain shocker, the combination of a frame mounted upon ground wheels, a pan tiltably carried by the frame, compressor wings mounted upon the pan and adapted to be folded downwardly to compress bundles within the pan, an elevator secured to the inner side of the frame and comprising a deck extending upwardly and outwardly toward and above the open side of the pan when in receiving position, a pusher arm mounted to oscillate back and forth with respect to said deck for feeding bundles upwardly thereon, means in train with one of the ground wheels for actuating said pusher arm, means in train with one of the ground wheels for closing said compressor wings, and connections between said two last named actuating means for stopping the movements of the pusher arm concurrently with the closing movement of the compressor wings, and means for thereafter tilting the pan, said means comprising a tread member adapted at the time indicated to be lowered into contact with the ground, substantially as described.

29. In a grain shocker, the combination of a frame, a pan tiltably carried by the frame, a pusher member movable toward and from the receiving portion of the pan and provided with a pair of bundle engaging members in spaced relation to one another, and an arresting member located adjacent the path of movement of the pusher member and in position to receive and momentarily arrest a bundle delivered by the more distant bundle engaging member and hold the same in position to thereafter be engaged by the more advanced bundle engaging member, substantially as described.

30. In a grain shocker, the combination of a frame mounted upon ground wheels, a pan tiltably carried by the frame, compressor members mounted upon the pan and adapted to fold inwardly to compress bundles within the pan, a ground engaging tread member associated with the pan for tilting the same, a latch for holding the tread member and pan in elevated relation with respect to the ground, means for delivering bundles into the pan, and co-ordinated mechanisms in train with the ground wheels for actuating the several mechanisms to first close the compressor members and thereafter unlatch the tread and pan and stop the feeding movements of the bundle delivering mechanism, substantially as described.

31. In a grain shocker, the combination of a frame mounted upon ground wheels, a pan vertically adjustably journaled upon the frame, a tread member associated with the pan for tilting the same, latch means for locking the pan at a predetermined elevation, latch means for normally holding the forward end of the pan and tread member in elevated relation, a compressor member carried by the pan, and co-ordinated mechanisms driven by the ground wheels and adapted when actuated to first operate the compressor member and thereafter in sequence withdraw the latch for the forward end of the pan and then unlock the latch for the pan, substantially as described.

32. In a grain shocker, the combination of a frame mounted upon ground wheels, a pan tiltably carried by the frame and having a vertically adjustable axis of revolution, a tread member associated with said pan, a compressor carried by the pan, latch mechanism for maintaining said pan axis at a predetermined elevation, latch mechanism for supporting the normally forward end of the pan, a butting board located adjacent the discharging end of the pan, means for retracting the butting board from said discharging end, a bundle elevator associated with the pan, connections with the ground wheels for operating said mechanisms, and means for controlling and timing said operations to first move said compressor to compressing position, then to withdraw the latch supporting the forward end of the pan to permit ground engagement by the tread member, then to withdraw the latch supporting the pan and concurrently therewith to suspend the operation of the elevator and withdraw the butting board, substantially as described.

SAMUEL H. YANCEY.
HARRY S. DICKINSON.